United States Patent [19]

Fujita et al.

[11] 3,928,403
[45] Dec. 23, 1975

[54] PROCESS FOR PREPARING FARNESYL ACETIC ACID ESTERS AND 2-SUBSTITUTED-PRODUCTS THEREOF

[75] Inventors: Yoshiji Fujita, Kurashiki; Yoshiaki Omura, Okayama; Takashi Nishida; Kazuo Itoi, both of Kurashiki, all of Japan

[73] Assignee: Kuraray Co., Ltd., Kurashiki, Japan

[22] Filed: July 10, 1974

[21] Appl. No.: 487,043

[30] Foreign Application Priority Data
July 13, 1973  Japan.......................... 48-79448

[52] U.S. Cl.................... 260/410.9 N; 260/410.9 R
[51] Int. Cl.².......................................... C11C 3/02
[58] Field of Search............... 260/410.9 R, 410.9 N

[56] References Cited
UNITED STATES PATENTS
3,154,570   10/1964   Adami.......................... 260/410.9 R OTHER PUBLICATIONS
Chemical Abstracts, 50:8445d.
Helv. Chim. Acta. 53, pp. 1827–1832, (1970).

*Primary Examiner*—Winston A. Douglas
*Assistant Examiner*—John F. Niebling
*Attorney, Agent, or Firm*—Bacon & Thomas

[57] ABSTRACT

Process for preparing farnesyl acetic acid esters represented by the general formula:

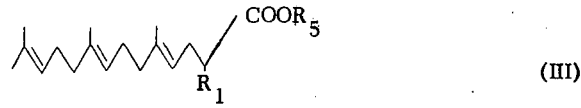

(III)

wherein $R_1$ represents a hydrogen atom, an alkyl group, a cycloalkyl group, an alkenyl group, a cycloalkenyl group, an alkynyl group or an aryl group and $R_5$ is the same as $R_2$, $R_3$ or $R_4$ hereinafter defined, which process comprises reacting nerolidol (3, 7, 11-trimethyl-1, 6, 10-dodecatrien-3-ol) represented by the formula:

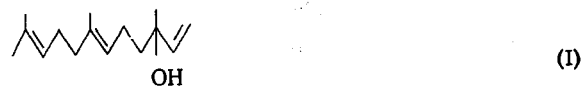

(I)

with 2-substituted orthoacetic acid ester derivatives represented by the general formula:

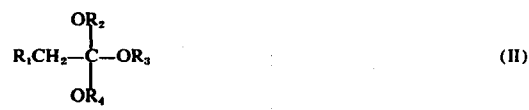

(II)

wherein $R_2$, $R_3$ and $R_4$, which are the same or different, each represents an alkyl group or a cycloalkyl group, in the presence of an acidic catalyst.

12 Claims, No Drawings

PROCESS FOR PREPARING FARNESYL ACETIC ACID ESTERS AND 2-SUBSTITUTED-PRODUCTS THEREOF

BACKGROUND OF THE INVENTION

1. Field of the Invention

The present invention relates to a process for preparing 2-substituted or unsubstituted farnesylacetic acid esters which are useful as antiulcer agents (see, e.g., U.S. Pat. No. 3,154,570).

2. Description of the Prior Art

2-Unsubstituted farnesylacetic acid esters have heretofore been prepared by reacting nerolidol represented by the formula:

OH                                    (I)

with phosphoorus tribromide to give farnesyl bromide represented by the formula:

Br                                    (IV)

and reacting the latter with a malonic acid ester in the presence of an alkali hydroxide to give a farnesylmalonic acid ester represented by the general formula:

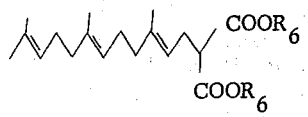

COOR$_6$                              (V)

wherein $R_6$ represents an alkyl group, and then subjecting (V) to hydrolysis, decarboxylation and esterification (Helv. Chim. Acta, 53, 1827 – 1832 (1970)).

SUMMARY OF THE INVENTION

Farnesylacetic acid esters of the above formula (III) may be effectively prepared in a single step in good yield by the process of the present invention which comprises reacting nerolidol (I) with a 2-substituted orthoacetic acid ester derivative represented by the general formula:

(II)

wherein $R_1$ represents a hydrogen atom, an alkyl group, a cycloalkyl group, an alkenyl group, a cycloalkenyl group, an alkynyl group, or an aryl group; and $R_2$, $R_3$ and $R_4$, which are the same or different, each represents an alkyl group or a cycloalkyl group, in the presence of an acidic catalyst. Among of the products produced by the present invention, 2-substituted farnesylacetic acid esters represented by the general formula:

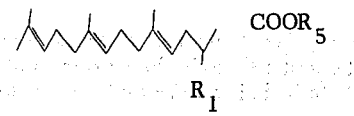

COOR$_5$ wherein $R_1$ represents hydrocarbon radical of 1 to 20 carbon atoms, such as, an alkyl group of 1 to 20 carbon atoms, a cycloalkyl group of 6 to 20 carbon atoms, an alkenyl group of 2 to 20 carbon atoms, a cycloalkenyl group of 6 to 20 carbon atoms an alkynyl group of 2 to 20 carbon atoms or an aryl group of 6 to 20 carbon atoms and wherein $R_5$ represents one of $R_2$, $R_3$ or $R_4$ as defined in formula (II) are novel and useful compounds especially as anti-ulcer agents as well as 2-unsubstituted farnesylacetic acid described in U.S. Pat. No. 3,154,570. The compounds 2-cyclohexyl farnesyl acetate and 2-phenyl farnesyl acetate described hereinafter in Examples 8 and 9 have been found to be particularly good anti-ulcer agents and can also be advantageously employed in the treatment of dermatosis.

DESCRIPTION OF THE PREFERRED EMBODIMENTS

The 2-substituted or unsubstituted farnesylacetic acid esters produced by the process of the present invention are represented by the general formula:

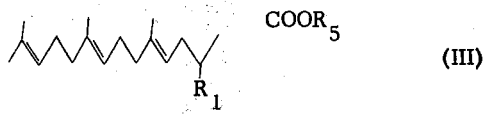

(III)

wherein $R_1$ is as defined in formula (II) and wherein $R_5$ represents one of $R_2$, $R_3$ or $R_4$ as defined in formula (II).

More specifically, $R_1$ may be a hydrogen atom, an alkyl group of 1 to 20 carbon atoms (e.g., methyl ethyl, propyl, butyl, amyl, decyl, pentadecyl, eicosyl, etc.), a cycloalkyl group of 6 to 20 carbon atoms (e.g., cyclohexyl, cycloheptyl, cyclodecyl, etc.), an alkenyl group of 2 to 20 carbon atoms (e.g., vinyl, allyl, pentenyl, octenyl, decenyl, nonadecenyl, etc.), a cycloalkenyl group of 6 to 20 carbon atoms (e.g., 1-cyclohexenyl, etc.), an alkynyl group of 2 to 20 carbon atoms (e.g., ethynel, propynyl, hexynyl, decynyl, etc.), or an aryl group of 6 to 20 carbon atoms (e.g., phenyl, naphthyl, etc.)

$R_2$, $R_3$ and $R_4$ may be the same or different and each represents an alkyl group of 1 to 8 carbon atoms (e.g., methyl, ethyl, propyl, butyl, pentyl, hexyl, heptyl, octyl, etc.), or a cycloalkyl group of 3 to 8 carbon atoms (e.g., cyclopropyl, cyclohexyl, cyclooctyl, etc.).

$R_1$, $R_2$ $R_3$ and $R_4$ each may have a total number of carbon atoms outside of the above ranges. Broadly, $R_1$ may be a hydrogen atom or any hydrocarbon radical having from 1 to 20 carbon atoms, including those groups above-mentioned and also including aralkyl, alkaryl, etc.

Typical examples of the compound (II) which may be used in the practice of the present invention are 1,1,1-trimethoxyethane, 1,1,1-triethoxyethane, 1,1,1-tripropoxyethane, 1,1,1-tricyclohexyloxyethane, 1,1,1-tri-(n-butoxy) ethane, 1,1,1-trimethoxypropane, 1,1,1-triethoxypropane, 1,1-dimethoxy-1-cyclohexyloxyethane, 1,1,1-triethoxybutane, 1,1,1-triethoxy-2-cyclohexylethane, and 1,1,1-triethoxy-2-phenylethane.

The acidic catalyst may be any conventional weak acid catalyst and is used generally in a conventional catalytic amount. Examples of the acidic catalyst are lower fatty acids (e.g., acetic acid, propionic acid, butyric acid, isobutyric acid, valeric acid, malonic acid, succinic acid, adipic acid, etc.); sulfonic acids (e.g., p-toluene-sulfonic acid, etc.); mineral acids (e.g., hydrochloric acid, sulfuric acid, etc.); and Lewis acids (e.g., zinc chloride, ferrous chloride, boron trifluoride, aluminum chloride, etc.). A suitable amount of the catalyst is 0.1 to 20 percent by weight, preferably 1 to 10 percent by weight, based on the weight of the nerolidol.

A solvent is not necessary in the reaction but inert solvents such as n-heptane, n-octane, benzene, toluene, o-xylene, m-xylene and p-xylene may be used. Alternatively, the 2-substituted orthoacetic acid esters may be used in excess in the form of a solvent.

The reaction may be effected at 50° to 200°C., preferably 100° to 150°C. in view of the reaction rate and selectivity, although the temperature is not critical and may vary outside of these ranges.

The nerolidol and 2-substituted orthoacetic acid ester derivative (II) should preferably be employed in about equimolar amounts, although the molar ratio of the former to the latter may be anywhere within the range of from 1/1.1 to 1/4.

The time of reaction is not critical and may vary from 2 to 30 hours. It is preferred that the alcohol which is formed as a by-product be removed during the reaction by distillation. The product farnesyl acetic acid ester may be recovered by first removing low boiling components from the reaction mixture (such as the catalyst and any unreacted 2-substituted orthoacetic acid ester derivative) and distilling the residue.

The following examples are intended to illustrate the invention as applied to representative products and are further for the purpose of illustrating the best mode contemplated for carrying out the invention and to supplement the foregoing disclosure of the invention with additional descriptions of the manner and process of carrying out the invention so as further to enable those skilled in the art to do so.

EXAMPLE 1

A mixture of nerolidol (44.8g), 1,1,1-trimethoxyethane (47.8g), and butyric acid (2.3g) is heated at 130° to 135°C. for 26 hours while removing (by distillation) methanol from the reaction phase. The reaction mixture is then evaporated, as is, to remove the low boiling materials such as butyric acid, whereby the unreacted 1,1,1-trimethoxyethane is recovered. The residue is distilled under high vacuum to give the objective methyl farnesylacetate as a distillate boiling at 130° to 132°C/0.3mm Hg. The yield is 92.3 percent.

EXAMPLES 2 to 9

These reactions are effected as in Example 1 except that various orthoorganic esters are used, as shown in the following table along with the results.

TABLE

| Example | Amount of Nerolidol | Orthoester | Acidic Catalyst | Reaction Conditions (°C., hours) | Product | Boiling Point (°C/mm Hg) | Yield (%) |
|---|---|---|---|---|---|---|---|
| 2 | 44.8g | $CH_3C(OEt)_3$ | isobutyric acid 2.3g | 130–135° 21 hr. | ethyl farnesyl-acetate | 163–167°C (2mm Hg) | 93.2 |
| 3 | " | $CH_3C(O-Pr)_3$ | isobutyric acid 2.3g | 133–138° 28 hr. | propyl farnesyl-acetate | 147–150°C (0.5 mm Hg) | 91.4 |
| 4 | " | $CH_3C(O-nBu)_3$ | n-butyric acid 4.0g | 135–142° 43 hr. | n-butyl farnesyl-acetate | 145–148°C (0.5mm Hg) | 90.0 |
| 5 | " |  | adipic acid 1.2g | 140–145° 48 hr. | cyclohexyl farnesyl-acetate | 162–164°C (0.3mm Hg) | 90.7 |
| 6 | " | $CH_3CH_2C(OMe)_3$ | propionic acid 0.9g | 125–127° 19 hr. | methyl-2-methyl farnesylacetate | 138–140°C (p.2mm Hg) | 94.2 |
| 7 | " | $CH_3CH_2CH_2C(OEt)_3$ | oxalic acid 0.2g | 129–132° 43 hr. | ethyl-2-ethyl farnesylacetate | 144–146°C (p.2mm Hg) | 93.8 |
| 8 | 11.2g |  | isobutyric acid 1.1g | 130–135° 8 hr. | ethyl-2-cyclohexyl farnesylacetate | 170–175°C (0.2mm Hg) | 91.6 |
| 9 | 11.2g |  | adipic acid 0.6g | 140–145° 19 hr. | ethyl-2-phenyl farnesylacetate | separated by column chromatography on silica gel | 87.2 |

EXAMPLE 10

Into a mixture of acrylonitrile (41g) and cyclohexanol (100g) cooled at 0° to 2°C., dry hydrogen chloride gas is introduced under stirring to precipitate the corresponding iminoether hydrochloride. Methanol (64g) is added at not more than 10°C. thereto, and the reaction is effected at 20° to 25°C. for 6 hours, whereby 1,1-dimethoxy-1-cyclohexyl-oxyethane is obtained in a yield of 62 percent.

A mixture of nerolidol (11.2g), 1,1-dimethoxy-1-cyclohexyloxyethane (20g) and butyric acid (0.6g) is heated at 120° to 125°C. for 32 hours. The reaction products are assayed by gas chromatography, wherein the conversion of nerolidol is almost 100 percent. The methyl ester obtained in Example 1 and the cyclohexyl ester obtained in Example 5 are prepared in a ratio of 3:7 by weight.

While the invention has been shown and described by reference to preferred embodiments thereof, it is to be expressly understood that various changes, modifications and/or substitutions may be made therein without departing from the spirit and scope thereof, it being the intention that the invention be limited only by the scope of the appended claims.

What is claimed is:

1. A process for preparing farnesyl acetic acid esters of the formula (I):

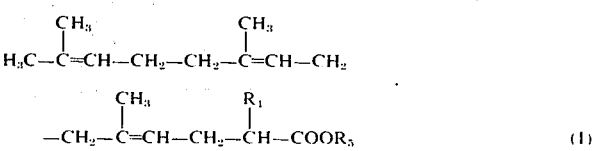

wherein $R_1$ represents a hydrogen atom or a hydrocarbon radical of 1 to 20 carbon atoms, and $R_5$ is the same as $R_2$, $R_3$ or $R_4$ below in formula (II), said process comprising reacting nerolidol with a 2-substituted orthoacetic acid ester derivative of the formula (II):

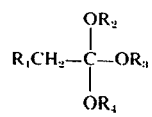

wherein $R_1$ is as defined in formula (I) above and $R_2$, $R_3$ and $R_4$, which may be the same or different, each represents an alkyl group of 1 to 8 carbon atoms or a cycloalkyl group of 3 to 8 carbon atoms; in the presence of an acidic catalyst.

2. The process of claim 1, wherein said $R_1$ is a hydrogen atom, an alkyl group of 1 to 20 carbon atoms, a cycloalkyl group of 6 to 20 carbon atoms, an alkenyl group of 2 to 20 carbon atoms, an alkynyl group of 2 to 20 carbon atoms, a cycloalkenyl group of 6 to 20 carbon atoms or an aryl group of 6 to 20 carbon atoms.

3. The process of claim 1, wherein the temperature of reaction is from 50° to 200°C.

4. The process of claim 1, wherein the reaction is performed in an inert solvent.

5. The process of claim 1, wherein the catalyst is employed in an amount of from 0.1 to 20 percent by weight, based on the weight of the nerolidol.

6. The process of claim 5, wherein said acidic catalyst is a weak acid.

7. The process of claim 6, wherein said acid is a lower fatty acid, a sulfonic acid, a mineral acid or a Lewis acid.

8. The process of claim 1, wherein said nerolidol and said 2-substituted orthoacetic acid ester are employed in substantially equimolar amounts.

9. The process of claim 1, wherein the molar ratio of said nerolidol to said 2-substituted orthoacetic acid ester is from 1/1.1 to 1/4.

10. The process of claim 1, wherein said 2-substituted orthoacetic acid ester is selected from the group consisting of 1,1,1-trimethoxyethane, 1,1,1-triethoxyethane, 1,1,1,-tripropoxyethane, 1,1,1-tricyclohexyloxyethane, 1,1,1-tri (n-butoxy) ethane, 1,1,1-trimethoxypropane, 1,1,1-triethoxypropane, 1,1-dimethoxy-1-cyclohexyloxyethane, 1,1,1-triethoxybutane, 1,1,1-triethoxy-2-cyclohexylethane, and 1,1,1-triethoxy-2-phenylethane.

11. A 2-substituted farnesyl acetic acid ester represented by the general formula:

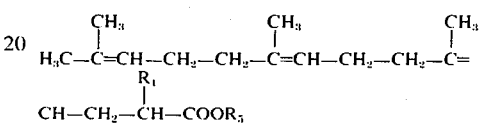

wherein $R_1$ is an alkenyl group of 2 to 20 carbon atoms, a cycloalkenyl group of 6 to 20 carbon atoms, an alkynyl group of 2 to 20 carbon atoms or an aryl group of 6 to 20 carbon atoms, and wherein $R_5$ is an alkyl group of 1 to 8 carbon atoms or a cycloalkyl group of 3 to 8 carbon atoms.

12. An ester of claim 11 wherein said $R_1$ is phenyl radical.

* * * * *

UNITED STATES PATENT OFFICE
CERTIFICATE OF CORRECTION

Patent No. 3,928,403  Dated December 23, 1975

Inventor(s) Yoshiji Fujita, Yoshiaki Omura, Takashi Nishida and Kazuo Itoi

It is certified that error appears in the above-identified patent and that said Letters Patent are hereby corrected as shown below:

In the following designated places "2-substituted" should read -- unsubstituted and 2-substituted --:

ABSTRACT, first line after formula I, after "with";

Column 1, line 47, after "with";

Column 3, line 32, after "the";

line 38, after "and";

line 49, after "unreacted";

Column 6, line 2, after "said";

line 5, after "said";

line 7, after "said".

Column 1, lines 11 and 12 should read -- esters which are useful as antiulcer agents or intermediates to produce the same (see, e.g., U.S. Patent No.

3,154,570). --

Column 5, lines 1 and 2 should read -- prising reacting nerolidol with an unsubstituted and 2- substituted orthoa- --.

Signed and Sealed this

Twenty-second Day of March 1977

[SEAL]

Attest:

RUTH C. MASON  
Attesting Officer

C. MARSHALL DANN  
Commissioner of Patents and Trademarks